United States Patent
Shah (10) Patent No.: US 11,490,430 B2
(45) Date of Patent: Nov. 1, 2022

(54) PACKET GATEWAY SELECTION BASED ON DEVICE CAPABILITIES

(71) Applicant: T-Mobile USA, Inc., Bellevue, WA (US)

(72) Inventor: Mehul Shah, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 237 days.

(21) Appl. No.: 17/004,952

(22) Filed: Aug. 27, 2020

(65) Prior Publication Data

US 2022/0070946 A1 Mar. 3, 2022

(51) Int. Cl.
| | |
|---|---|
| *H04W 48/00* | (2009.01) |
| *H04W 76/10* | (2018.01) |
| *H04W 8/26* | (2009.01) |
| *H04W 88/16* | (2009.01) |
| *H04W 8/22* | (2009.01) |
| *H04L 61/4511* | (2022.01) |

(52) U.S. Cl.
CPC ......... *H04W 76/10* (2018.02); *H04L 61/4511* (2022.05); *H04W 8/22* (2013.01); *H04W 8/26* (2013.01); *H04W 88/16* (2013.01)

(58) Field of Classification Search
CPC ......... H04W 76/10; H04W 8/22; H04W 8/26; H04W 88/16; H04W 48/17; H04L 61/4511; H04L 2101/375
See application file for complete search history.

(56) References Cited

U.S. PATENT DOCUMENTS

| | | | |
|---|---|---|---|
| 6,925,069 | B2 | 8/2005 | Koos et al. |
| 7,042,988 | B2 | 5/2006 | Juitt et al. |
| 7,305,090 | B1 | 12/2007 | Hayes et al. |
| 7,346,025 | B2 | 3/2008 | Bryson |
| 7,562,393 | B2 | 7/2009 | Buddhikot et al. |
| 7,660,584 | B2 | 2/2010 | Mizell et al. |
| 7,684,374 | B2 | 3/2010 | Karaoguz et al. |
| 7,715,351 | B2 | 5/2010 | Karaoguz et al. |
| 7,809,003 | B2 | 10/2010 | Makela |
| 7,853,255 | B2 | 12/2010 | Karaoguz et al. |
| 7,865,506 | B1 | 1/2011 | Pedersen |
| 7,916,701 | B1 | 3/2011 | Viswanath et al. |

(Continued)

FOREIGN PATENT DOCUMENTS

CA 2777647 C * 5/2014 ............... G06F 8/61

*Primary Examiner* — Joseph E Dean, Jr.
(74) *Attorney, Agent, or Firm* — Perkins Coie LLP (57) ABSTRACT

Methods, apparatus, and systems for selecting appropriate gateway servers for user devices with different device capabilities are disclosed. In one example aspect, a wireless communication method includes provisioning multiple wireless electronic devices of a user with a first access point name, and receiving, from a wireless electronic device of the multiple wireless electronic devices of the user, a request for establishing a data session. The method also includes determining, in part based on a capability of the wireless electronic device, a second access point name that is different from the first access point name and selecting a packet gateway server corresponding to the capability of the wireless electronic device using the second access point name. The method further includes establishing the data session between the packet gateway server and the wireless electronic device.

20 Claims, 4 Drawing Sheets

(56) References Cited

U.S. PATENT DOCUMENTS

| | | |
|---|---|---|
| 8,064,951 B2 | 11/2011 | Woodson et al. |
| 8,199,731 B2 | 6/2012 | Bourque |
| 8,233,934 B2 | 7/2012 | Ahmavaara et al. |
| 8,290,498 B2 | 10/2012 | Karaoguz et al. |
| 8,295,817 B2 | 10/2012 | Alfano et al. |
| 8,391,262 B2 | 3/2013 | Maki et al. |
| 8,457,082 B2 | 6/2013 | Hicks et al. |
| 8,503,358 B2 | 8/2013 | Hanson et al. |
| 8,503,460 B2 | 8/2013 | Ahmavaara |
| 8,559,392 B2 | 10/2013 | Puthiyandyil et al. |
| 8,588,793 B2 | 11/2013 | Tomici et al. |
| 8,688,103 B2 | 4/2014 | Doshi |
| 8,700,729 B2 | 4/2014 | Dua |
| 8,743,828 B2 | 6/2014 | Wang et al. |
| 8,804,574 B2 | 8/2014 | Siomina et al. |
| 8,818,331 B2 | 8/2014 | Mohammed et al. |
| 8,867,575 B2 | 10/2014 | Mohammed et al. |
| 8,910,300 B2 | 12/2014 | Varsavsky Waisman-Diamond et al. |
| 9,014,631 B2 | 4/2015 | Dua |
| 9,258,704 B2 | 2/2016 | Zucker |
| 9,264,898 B2 | 2/2016 | Schroeder et al. |
| 9,439,071 B2 | 9/2016 | Jabara et al. |
| 9,451,464 B2 | 9/2016 | Fan et al. |
| 9,451,643 B2 | 9/2016 | John et al. |
| 9,480,092 B2 | 10/2016 | Horn et al. |
| 9,503,970 B2 | 11/2016 | Horn et al. |
| 9,510,376 B2 | 11/2016 | Wang et al. |
| 9,565,117 B2 | 2/2017 | Dahod et al. |
| 9,622,143 B1 | 4/2017 | Sankaran et al. |
| 9,650,794 B2 | 5/2017 | Stojanovski et al. |
| 9,930,613 B2 | 3/2018 | Starsinic |
| 10,123,368 B2 | 11/2018 | Gundavelli et al. |
| 10,165,091 B1 | 12/2018 | Bittfield et al. |
| 10,212,639 B2 | 2/2019 | Kodaypak |
| 10,306,579 B2 | 5/2019 | Zhang et al. |
| 2015/0282026 A1 | 10/2015 | Gupta |
| 2018/0146375 A1* | 5/2018 | Pawar ............... H04W 28/0289 |
| 2018/0167982 A1* | 6/2018 | Lee ....................... H04W 76/10 |
| 2019/0036908 A1 | 1/2019 | Liu et al. |
| 2020/0305211 A1 | 9/2020 | Foti et al. |

* cited by examiner

PACKET GATEWAY SELECTION BASED ON DEVICE CAPABILITIES

BACKGROUND

A gateway server is used in telecommunications networks to allow data to flow from one discrete network to another. A user device can have simultaneous connectivity with one or more gateway servers for accessing multiple data networks. Selection of the gateway servers can impact various aspects of the communication, such as reliability, efficiency, and/or latency, thereby affecting the overall user experience.

DETAILED DESCRIPTION

Figure 1:
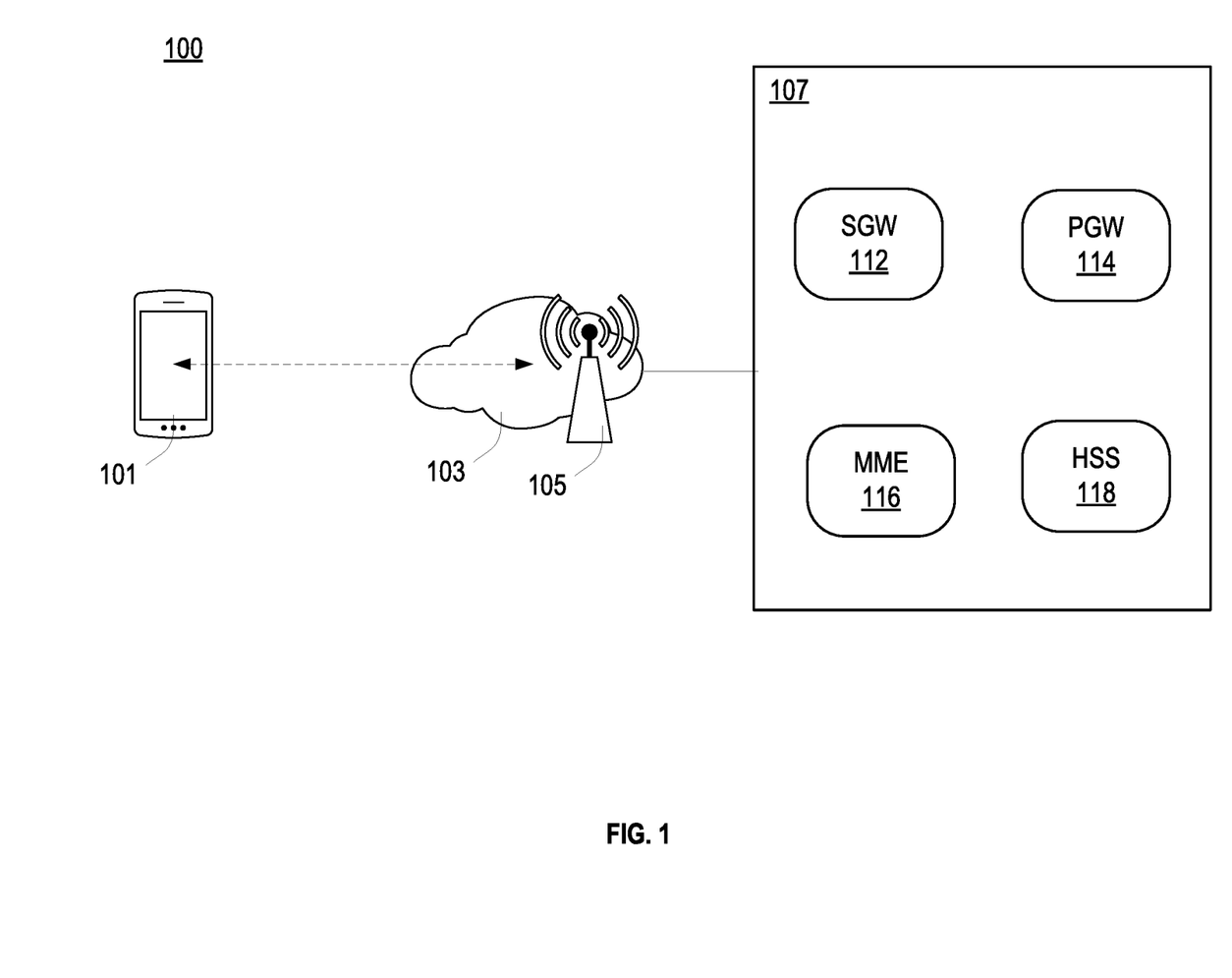
FIG. 1 illustrates an example architecture of Evolved Packet Core (EPC) in Long-Term Evolution (LTE) communication systems.

In wireless communications, the architecture of the General Packet Radio Service (GPRS) relies on circuit-switching. That is, circuits are established between the calling parties throughout the telecommunication network. To facilitate more flexible data transmissions, packet-switching is added to circuit-switching so that data is transported in packets without the establishment of dedicated circuits. Because packet-switching offers more flexibility and efficiency, the Internet Protocol (IP) is used in Fourth-Generation (4G) Long-Term Evolution (LTE) systems as the protocol to transport all services, eliminating the need for separate circuit domain and packet domain. FIG. 1 illustrates an example architecture of Evolved Packet Core (EPC) 100 in LTE communication systems. As shown in FIG. 1, a User Equipment (UE) 101 is connected to the EPC over an access network (e.g., the Evolved Universal Mobile Telecommunication Service Terrestrial Radio Access Network, E-UTRAN) 103 that includes one or more base stations (eNodeB) 105. The EPC 107 comprises four main elements: the Serving Gateway (SGW) 112, the Packet Data Network Server (PGW) 114, the Mobility Management Entity (MME) 116, and the Home Subscriber Server (HSS) 118. In particular, the PGW 114 is the gateway server that routes packets to and from the Packet Data Network (PDN). The PGW 114 also performs various other functions such as IP allocation or policy control.

With the advancement in wireless technologies, the 5G/New Radio (NR) wireless protocol can support data connectivity and services enabling deployments. In particular, the 5G core (5GC) network architecture enables a separation of the gateway functions into control plane (CP) and user plane (UP). The CP and UP separation (also referred to CP-UP split) allows for flexible deployment of UP separate from the CP and enables UP distribution and edge breakout of traffic already in the EPC. For example, separate PDN connections can use different PGW-U/PGW-Us in central and local deployments.

Figure 2:
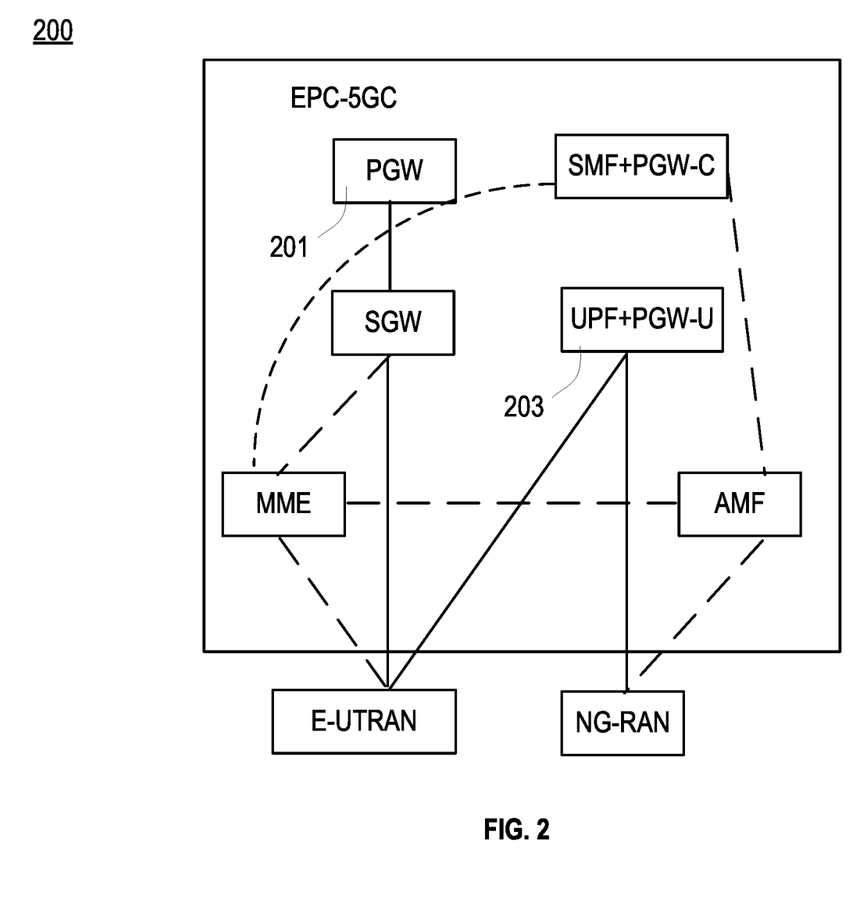
FIG. 2 illustrates an example EPS and Fifth-Generation Core (5GC) interworking in accordance with the present technology.

During the migration period when NR coverage is expanding, services requiring wide-area coverage are best supported through interworking between the 5G Core (5GC) and the existing Evolved Packet Core (EPC). To enable IP address preservation when connecting over and changing between 4G and 5G access, the 5GC architecture includes a common UP anchor point (e.g., by the session management function (SMF) plus packet data network gateway control plane function (SMF+PGW-C) and the user plane function (UPF) plus PGW user plane function (UPF+PGW-U). FIG. 2 illustrates an example of EPS-5GC interworking in accordance with the present technology.

As the wireless technologies evolve, capabilities of the user devices also evolve at the same time. To provide simultaneous support for multiple generations of technologies (e.g., 4G/LTE, 5G/NR, and other future generations of wireless technologies), a network deployment needs to support newer and legacy devices at the same time. For example, as shown in FIG. 2, a UE that has both 4G/LTE and 5G/NR capabilities can be anchored to either the LTE PGW 201 via the E-UTRAN or the 5G UPF+PGW-U 203 via the New Generation Radio Access Network (NG-RAN). In some embodiments, it is desirable for a network operator to anchor a user device to certain packet gateways according to the device capabilities. For example, anchoring the 5G-capable device to UPF+PGW-U for 5GC can minimize communication latency, thereby providing better user experiences for the user.

User devices are often provisioned on a per-user basis by network operators. That is, under the Domain Name Server (DNS) resolution mechanism, a user can be provisioned with a set of unique Access Point Names (APNs) for the associated devices so that data sessions using these APNs can be anchored on corresponding PGWs. However, a user can have devices with different capabilities (e.g., devices that support 3G and/or LTE technologies only, and devices that support 5G). When the user changes from an LTE device to a 5G device to access the network, the data sessions anchored on a previous set of gateways (e.g., PGWs for EPC) cannot provide optimal connections for the 5G device.

This patent document discloses techniques that can be implemented in various embodiments to allow flexible selections of gateway servers to anchor the user devices to appropriate gateway servers according to device capabilities. The disclosed techniques introduce minimal changes to the existing provisioning mechanism and DNS resolution framework, while enabling optimal connections and providing better user experiences.

Figure 3:
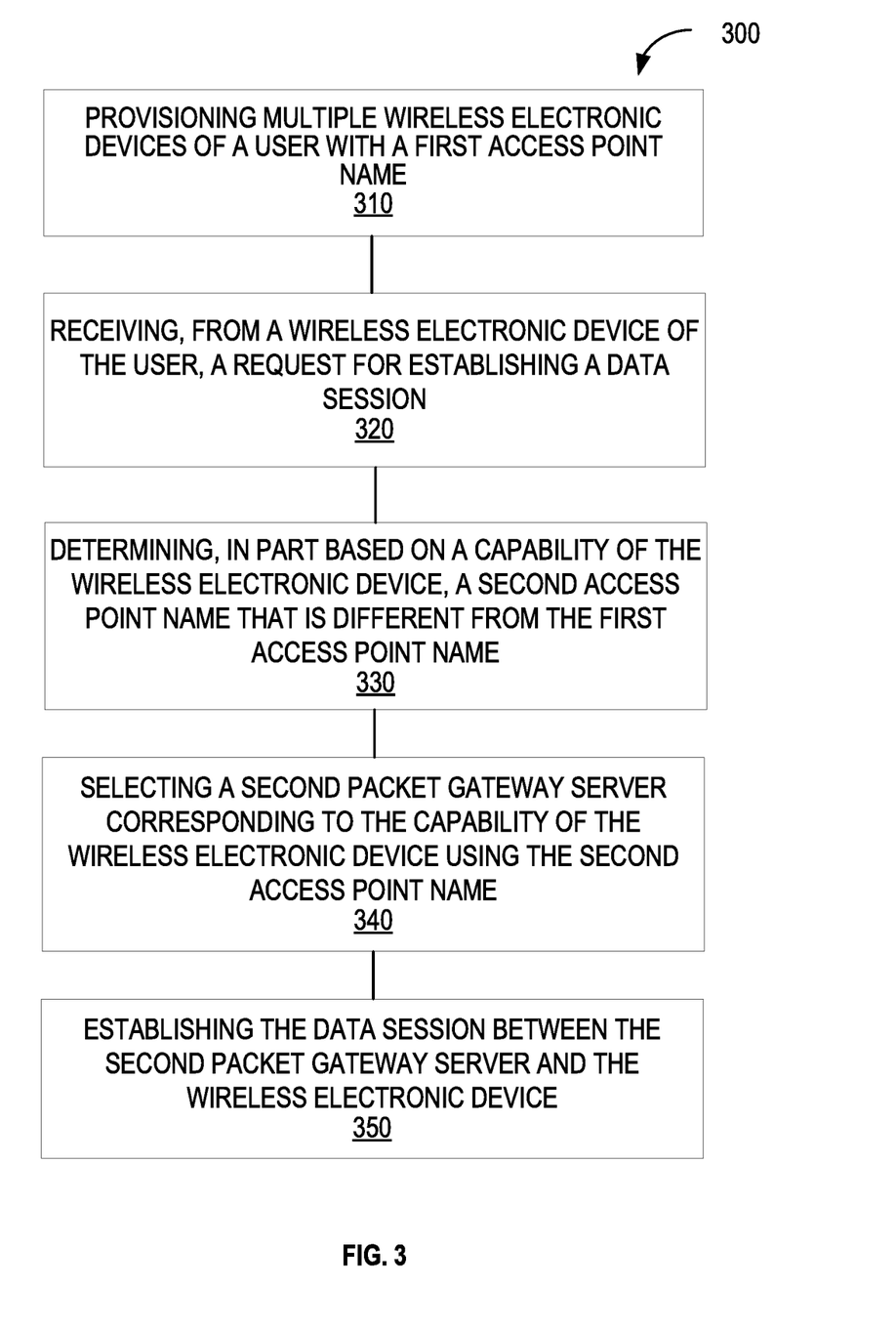
FIG. 3 is a flowchart representation of a method for wireless communication in accordance with one or more embodiments of the present technology.

FIG. 3 is a flowchart representation of a method 300 for wireless communication in accordance with one or more embodiments of the present technology. The method 300 includes, at operation 310, provisioning multiple wireless electronic devices of a user with a first access point name (APN). For example, the wireless electronic devices of the user can be provisioned with a generic data APN (e.g., internet.domain.com) when the user signs up for service. In some embodiments, the generic data APN is not associate with any access technologies. That is, the generic data APN serves as a placeholder for the user. The actual APNs that are used to anchor the data sessions are determined subsequently in part based on the capabilities and user's devices. In some embodiments, the generic data APN can correspond to a first gateway server associated with a first radio access technology (e.g., a default gateway server with a default access technology). For example, the generic data APN can correspond to the PGW in EPC for LTE wireless communications.

The method 300 includes, at operation 320, receiving, from a wireless electronic device of the user, a request for establishing a data session. Once the user is provisioned with the first APN (e.g., the generic data APN), all requests from the user for a data session are associated with the first APN initially. In some embodiments, the multiple wireless electronic devices of the user have different capabilities. For example, some of the electronic devices of the user have 4G capabilities while some of the wireless electronic devices of the user can have both 4G and 5G capabilities. The network can maintain a list of alternative or alias APNs that are mapped to the capabilities of the devices of the user and/or the corresponding access technologies. In some embodiments, the capability of the wireless electronic device is indicated based on a unique identifier of the device. The capability of the wireless electronic device can indicate a radio access technology that is supported by the wireless electronic device. For example, the International Mobile Equipment Identify (IMEI) of the device can be used to identify the device capabilities. Table 1 shows an example mapping of the device IMEI, the radio access technologies (RATs), and alias APNs.

TABLE 1

| Device Identifier | RAT | Alias APN |
| --- | --- | --- |
| IMEI range A (e.g. 2G/3G capable devices) | 2G | aliasAPN1.domain.com |
| IMEI range A (e.g. 2G/3G capable devices) | 3G | aliasAPN2.domain.com |
| IMEI range B (e.g. 4G only devices) | 4G | aliasAPN3.domain.com |
| IMEI range C (e.g. 4G/5G devices) | 4G | aliasAPN3.domain.com |
| IMEI range C (e.g. 4G/5G devices) | 5G | aliasAPN4.domain.com |

The method 300 includes, at operation 330, determining, in part based on a capability of the wireless electronic device, a second access point name that is different from the first access point name. Given the request from specific device of the user and the list of alias APNs, the network can use the IMEI of the device to determine which alias APN is to be used for the selection of the packet gateway.

In some embodiments, the determining of the second access point name is also based on the access technology over which the request is received. For example, the IMEI of a device is within the range C, which indicates that the device supports both 4G and 5G capabilities. The request from the device is received using the 4G RAT. Therefore, the alias APN to be used for the data session is aliasAPN3.domain.com for 4G communications. As another example, the IMEI of another device is also within the range C for both 4G and 5G capable devices. The request from the device is received using the 5G RAT. Therefore, the alias APN to be used for the data session is aliasAPN4.domain.com for 5G communications.

In some embodiments, the determining of the second access point name is further based on load balancing of the network. For example, the IMEI of a device is within the range C, which indicates that the device supports both 4G and 5G capabilities. The network determines that the EPC carries a load of 20% and the 5GC carries a load of 80%. A PWG in the EPC can be selected to establish the data session to avoid potentially service latency caused by the heavy load of 5GC. Therefore, the alias APN to be used for the data session is aliasAPN3.domain.com for LTE communications.

In some embodiments, the determining of the second access point name can be based on specific device families. For example, a specific APN aliasAPN1.domain.com can be assigned to Android devices with 2G/3G capacities. A different APN aliasAPN2.domain.com can be assigned to iOS devices with the same 2G/3G capabilities. A third APN aliasAPN3.domain.com can be assigned to iOS devices with different capacities (e.g., 4G or 5G capabilities).

The method 300 includes, at operation 340, selecting a second packet gateway server corresponding to the capability of the wireless electronic device using the second access point name. Once the alias APN is determined, a DNS query can be performed using the alias APN as opposed to the initially provisioned generic data APN from the device. The IP address of the selected packet gateway server can be returned in the DNS response. It is noted that the use of alias APNs imposes no changes in the existing DNS framework. That is, the DNS queries and responses can be agnostic about the generic data APN and the alias APNs. Specific information regarding the device capabilities and/or RATs can thus be hidden from the DNS framework and does not result in any additional DNS queries. In some embodiments, when changes to the existing DNS entries are allowed, the DNS query can include a part of the device IMEI, such as the Type Allocation Code (TAC). The TAC can be used to identify a particular model and/or a revision of the device so that specific gateway can be selected based on device families.

In some embodiments, the second packet gateway server is associated a second radio access technology that is different than the first radio access technology. For example, given the alias APN aliasAPN4.domain.com, a PGW-U for 5GC can be selected for the device that is capable of handling both 4G and 5G communications. Here, the second RAT (e.g., 5G RAT) is different than the default RAG (e.g., 4G RAT) for the generic data APN for the user.

The method 300 also includes, at operation 350, establishing the data session between the second packet gateway server and the wireless electronic device. Given the IP address in the DNS response, the data session can be established accordingly. The user device is now provided with connecting to the network via the data session to transmit and/or receive data.

CONCLUSION

As noted above, the disclosed techniques can be implemented, with minimal changes to the existing DNS framework, to select appropriate gateway servers to anchor data traffic for user devices based on device capabilities. For devices with better capabilities (e.g., 5G capable devices), appropriate packet data gateways can be used to minimize service latency and delay, thereby providing better overall user experiences to the user. Based on the existing per-user provisioning mechanism, the disclosed techniques allow flexible gateway determinations for different devices of the same user.

Figure 4:
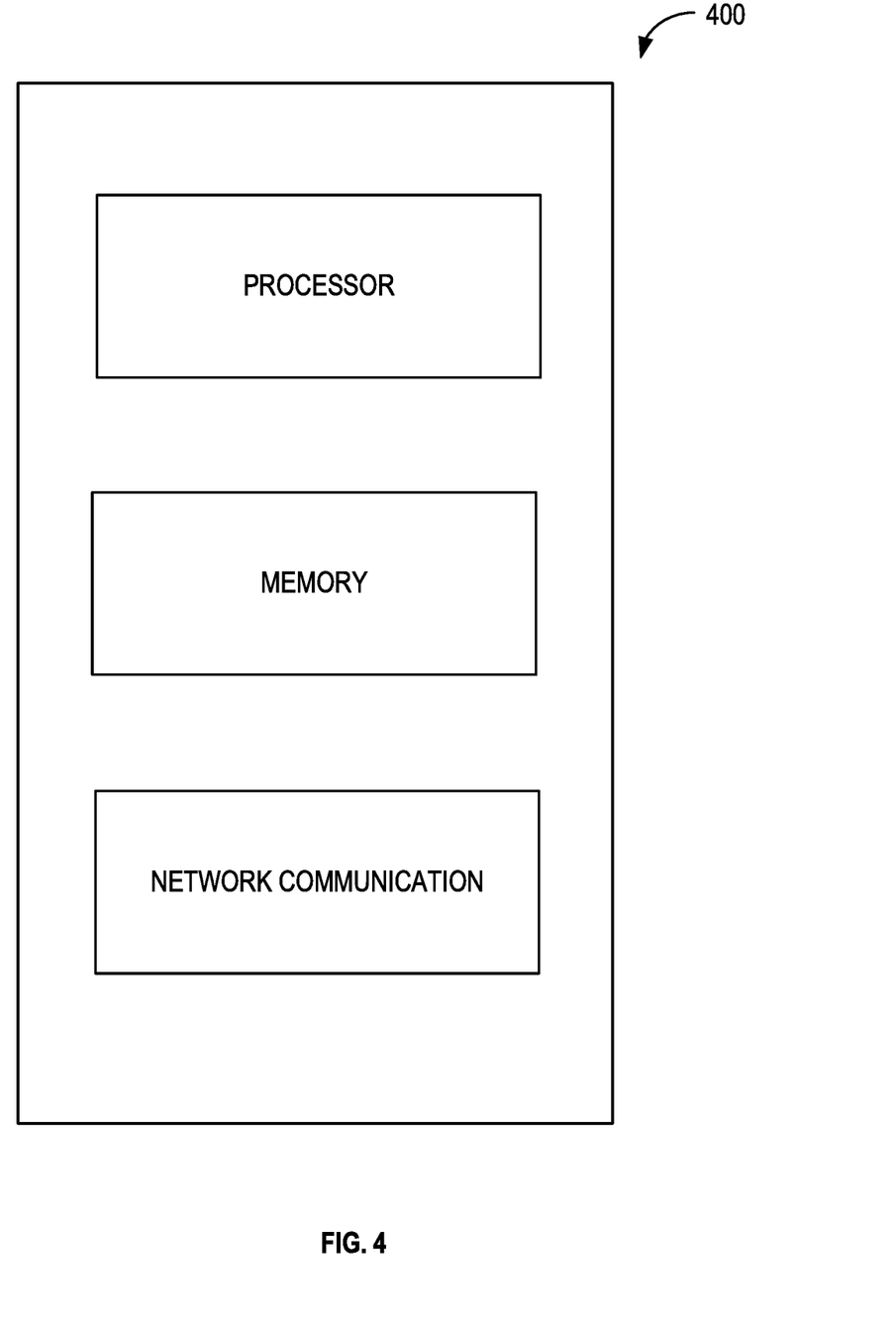
FIG. 4 is a diagrammatic representation of a machine in the example form of a computer system within which a set of instructions, for causing the machine to perform any one or more of the methodologies or modules discussed herein, can be executed.

FIG. 4 is a diagrammatic representation of a machine in the example form of a computer system 400 within which a set of instructions, for causing the machine to perform any one or more of the methodologies or modules discussed herein, can be executed. In the example of FIG. 4, the computer system 400 includes a processor, memory, non-volatile memory, and a network communication interface device. Various common components (e.g., cache memory)

are omitted for illustrative simplicity. The computer system 400 is intended to illustrate a hardware device on which any of the components described in the example of FIGS. 1-8 (and any other components described in this specification) can be implemented. The computer system 400 can be of any applicable known or convenient type. The components of the computer system 400 can be coupled together via a bus or through some other known or convenient device.

This disclosure contemplates the computer system 400 taking any suitable physical form. As example and not by way of limitation, computer system 400 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 can include one or more computer systems 400; be unitary or distributed; span multiple locations; span multiple machines; or reside in a cloud, which can include one or more cloud components in one or more networks. Where appropriate, one or more computer systems 400 can perform without substantial spatial or temporal limitation one or more steps of one or more methods described or illustrated herein. As an example and not by way of limitation, one or more computer systems 400 can perform in real time or in batch mode one or more steps of one or more methods described or illustrated herein. One or more computer systems 400 can perform at different times or at different locations one or more steps of one or more methods described or illustrated herein, where appropriate.

The processor can be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 400. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory can not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 400. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 5 reside in the interface.

In operation, the computer system 400 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

A storage medium typically can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, and any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

The invention claimed is:

1. A computer-implemented method for wireless communication, the method comprising:
provisioning multiple wireless electronic devices of a user with a first access point name, wherein the first access point name corresponds to a first gateway server associated with a first radio access technology;
receiving, from a wireless electronic device of the multiple wireless electronic devices of the user, a request for establishing a data session;
determining, in part based on a capability of the wireless electronic device, a second access point name that is different from the first access point name;
selecting a second packet gateway server corresponding to the capability of the wireless electronic device using the second access point name,
wherein the second packet gateway server is associated a second radio access technology that is different than the first radio access technology, and
wherein the first and second packet gateway servers are both associated with a cellular wireless communications network; and
establishing the data session between the second packet gateway server and the wireless electronic device.

2. The method of claim 1, wherein at least one other wireless electronic device of the user has a different capability from the multiple wireless electronic devices, and wherein both the wireless electronic device and the cellular wireless communications network have 4G and 5G capabilities.

3. The method of claim 1, wherein the capability of the wireless electronic device is indicated based on a unique identifier of the wireless electronic device, wherein the unique identifier comprises an International Mobile Equipment Identity (IMEI), and wherein the capability of the wireless electronic device indicates a radio access technology that is supported by the wireless electronic device.

4. The method of claim 1, wherein the first access point name comprises a generate data access point name that is used as a placeholder for the wireless electronic device of the user.

5. The method of claim 1, wherein the determining of the second access point name is further based on a third radio access technology over which the request is received, and wherein the second radio access technology is same as the third radio access technology.

6. The method of claim 1, wherein the determining of the second access point name is further based on a third radio access technology over which the request is received.

7. The method of claim 1, wherein selecting the second packet gateway server comprises:
transmitting a domain name server query using the second access point name; and
receiving an internet protocol address of the second packet gateway server in response to the domain name server query.

8. A system configured for use with a wireless telecommunications network, the system comprising:
at least one processor;
at least one memory storing instructions, when executed by the at least one processor, configure the at least one processor to:
provision multiple wireless electronic devices of a user with a first access point name;
receive, from a wireless electronic device of the multiple wireless electronic devices of the user, a request for establishing a data session;
determine, in part based on a capability of the wireless electronic device, a second access point name that is different from the first access point name;
select a packet gateway server corresponding to the capability of the wireless electronic device using the second access point name; and establish the data session between the packet gateway server and the wireless electronic device.

9. The system of claim 8, wherein the first access point name comprises a generate data access point name that is used as a placeholder for the wireless electronic device of the user.

10. The system of claim 9, wherein the packet gateway server is associated a second radio access technology, wherein the second access point name is determined further based on a third radio access technology over which the request is received.

11. The system of claim 10, wherein the second radio access technology is same as the third radio access technology.

12. The system of claim 8, wherein at least one other wireless electronic device of the user has a different capability from the multiple wireless electronic devices, and wherein both the wireless electronic device and the wireless telecommunications network have 4G and 5G capabilities.

13. The system of claim 8, wherein the capability of the wireless electronic device is indicated based on a unique identifier of the wireless electronic device, and wherein the unique identifier comprises an International Mobile Equipment Identity.

14. The system of claim 8, wherein the at least one processor is configured to select the packet gateway server based on:
   transmitting a domain name server query using the second access point name; and
   receiving an internet protocol address of the packet gateway server in response to the domain name server query.

15. A non-transitory computer readable storage medium storing computer readable code, the code, when executed by a processor, causing the processor to implement a method that comprises:
   provisioning one or more wireless electronics devices of a user with a first access point name;
   receiving, from a wireless electronic device of the one or more wireless electronic devices of the user, a request for establishing a data session;
   determining, in part based on a capability of the wireless electronic device, a second access point name that is different from the first access point name;
   selecting a packet gateway server in a cellular wireless communications network corresponding to the capability of the wireless electronic device using the second access point name; and
   establishing the data session between the packet gateway server and the wireless electronic device.

16. The non-transitory computer readable storage medium of claim 15, wherein the first access point name corresponds to a first radio access technology, wherein the packet gateway server is associated a second radio access technology that is different than the first radio access technology, and wherein the second access point name is determined further based on a balance of workload between the first radio access technology and the second radio access technology.

17. The non-transitory computer readable storage medium of claim 15, wherein the first access point name corresponds to a first radio access technology, and wherein the packet gateway server is associated a second radio access technology that is different than the first radio access technology.

18. The non-transitory computer readable storage medium of claim 15, wherein at least a first wireless electronic device of the user has a different capability from a second wireless electronic device of the user, and wherein both the first and second wireless electronic devices and the cellular wireless communications network have 4G and 5G capabilities.

19. The non-transitory computer readable storage medium of claim 15, wherein the capability of the wireless electronic device is indicated based on a unique identifier of the wireless electronic device, and wherein the unique identifier comprises an International Mobile Equipment Identity.

20. The non-transitory computer readable storage medium of claim 15, wherein the selecting of the packet gateway server comprises:
   transmitting a domain name server query using the second access point name; and
   receiving an internet protocol address of the packet gateway server in response to the domain name server query.

* * * * *